· US010660116B2

(12) United States Patent
Rask et al.

(10) Patent No.: US 10,660,116 B2
(45) Date of Patent: May 19, 2020

(54) FALSE SCHEDULING REQUEST PREVENTION

(71) Applicant: TELEFONAKTIEBOLAGET LM ERICSSON (PUBL), Stockholm (SE)

(72) Inventors: Patrik Rask, Sollentuna (SE); Fredrik Huss, Sundbyberg (SE); Dániel Pelyhe, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 15/526,491

(22) PCT Filed: Nov. 28, 2014

(86) PCT No.: PCT/SE2014/051424
§ 371 (c)(1),
(2) Date: May 12, 2017

(87) PCT Pub. No.: WO2016/085377
PCT Pub. Date: Jun. 2, 2016

(65) Prior Publication Data
US 2017/0339708 A1    Nov. 23, 2017

(51) Int. Cl.
*H04W 72/12*     (2009.01)
*H04L 1/20*      (2006.01)
(Continued)

(52) U.S. Cl.
CPC ........... *H04W 72/1226* (2013.01); *H04L 1/20* (2013.01); *H04L 27/2626* (2013.01);
(Continued)

(58) Field of Classification Search
None
See application file for complete search history.

(56) References Cited

U.S. PATENT DOCUMENTS

2010/0142467 A1*  6/2010  Tiirola ................. H04L 5/0053
                                                        370/329
2011/0110240 A1*  5/2011  Bergquist .......... H04W 74/0866
                                                        370/241.1
(Continued)

FOREIGN PATENT DOCUMENTS

WO        2009105003 A1     8/2009
WO    WO 2013028113 A1     2/2013
(Continued)

OTHER PUBLICATIONS

Ericsson, "Scheduling Request in E-UTRAN," 3GPP TSG-RAN WG2 #56bis, R2-070056, Jan. 15-19, 2007, Sorrento, IT.
(Continued)

*Primary Examiner* — Chi H Pham
*Assistant Examiner* — Raul Rivas
(74) *Attorney, Agent, or Firm* — Sage Patent Group

(57) ABSTRACT

The invention relates to a scheduling node and a method at the scheduling node in a wireless communication network of scheduling mobile terminals submitting Scheduling Requests (SRs) in SR resources. The invention further relates to a computer program performing the method according to the present invention, and a computer program product comprising computer readable medium having the computer program embodied therein. A method at a scheduling node in a wireless communication network of scheduling mobile terminals submitting Scheduling Requests (SRs) in SR resources is provided. The method comprises detecting that an SR received from a first mobile terminal in a first SR resource is indicated to interfere with at least a second SR resource, scheduling the first mobile terminal at a first scheduling occasion and awaiting scheduling of a second mobile terminal associated with the second SR resource at least until a second scheduling occasion.

18 Claims, 12 Drawing Sheets

(51) Int. Cl.
*H04L 27/26* (2006.01)
*H04W 72/04* (2009.01)
*H04W 72/08* (2009.01)
*H04W 88/02* (2009.01)
*H04W 88/08* (2009.01)

(52) U.S. Cl.
CPC ..... *H04W 72/0413* (2013.01); *H04W 72/082* (2013.01); *H04W 72/1284* (2013.01); *H04W 88/02* (2013.01); *H04W 88/08* (2013.01)

(56) References Cited

U.S. PATENT DOCUMENTS

2011/0128872 A1* 6/2011 Lindoff ................ H04J 11/0069
370/252
2012/0100864 A1* 4/2012 Susitaival ............... H04L 1/188
455/450

FOREIGN PATENT DOCUMENTS

| WO | WO 2013054850 A1 | 4/2013 |
|---|---|---|
| WO | 2013091137 A1 | 6/2013 |

OTHER PUBLICATIONS

International Search Report and Written Opinion dated Sep. 11, 2015 in related International Application No. PCT/SE2014/051424.
SESR—EP 14906866.0—dated May 22, 2018—pp. 7.

* cited by examiner

FALSE SCHEDULING REQUEST PREVENTION

TECHNICAL FIELD

The invention relates to a scheduling node and a method at the scheduling node in a wireless communication network of scheduling mobile terminals submitting Scheduling Requests (SRs) in SR resources. The invention further relates to a computer program performing the method according to the present invention, and a computer program product comprising computer readable medium having the computer program embodied therein.

BACKGROUND

Mobile terminals, such as User Equipment (UE), are allocated Scheduling Request (SR) resources on a Physical Uplink Control Channel (PUCCH) to be able to inform a base station, such as e.g. an eNodeB, that the UE has data to be sent. Thus, the UE will submit an SR in a slot or resource of the PUCCH, and a scheduler of the eNodeB will subsequently attend to the SR and schedule the UE accordingly for data transmission.

The SR resources on the PUCCH can be allocated using different strategies. There are four different ways to assign the allocations to the PUCCH:
1. In time domain: allocating different UEs to different Transmission Time Intervals (TTIs),
2. In frequency domain: use different Resource Blocks (RBs) for different UEs,
3. Different cyclic shifts: users can use the same RBs and the same TTI but be separated in cyclic shifts, and
4. Different orthogonal sequences: users with the same RB, same TTI, and same cyclic shift can use different orthogonal sequences to be separated from each other.

In Long-Term Evolution (LTE) wireless communication networks, orthogonal frequency-division multiplexing (OFDM) modulation is employed, and the scheduler of the eNodeB dynamically assigns OFDM resource blocks to UEs for uplink or downlink transmission. These resource blocks assignments consists of both time and frequency assignments.

With reference to FIG. 1, the smallest physical resource in LTE is called a resource element and consists of one OFDM subcarrier over the duration of one OFDM symbol. An RB consists of 12 OFDM subcarriers over a 0.5 ms slot. The allocation of RBs is defined over Transmission Time Intervals (TTIs) of 1 ms and therefore the minimum scheduling unit is called an RB pair which consists of two RBs. Any number of RBs, from 1 to 110, can be allocated to a UE. This represents a bandwidth between 0.18 and 19.8 MHz. As previously was mentioned, and as will be discussed in more detail, the allocation of SR resources can further be complemented with the use of cyclic shifts and orthogonal sequences.

Each RB pair on the PUCCH has 12 different cyclic shifts and 3 orthogonal sequences making it possible to allocate 36 SR resources on the same TTI and the same RB if all orthogonal sequences and all cyclic shifts are used. In order not to waste RBs on the PUCCH, it is desirable to make use of all SR resources.

In the art, when using SRs on the PUCCH to request resources for the UEs, it may happen that the scheduler of the eNodeB schedules a UE even though the UE did not submit an SR in an SR resource. Thus, the scheduler falsely detects a signal in the SR resource and considers the UE associated with said SR resource to have made a scheduling request. As a consequence, resources are allocated to users which effectively has not requested such allocation.

SUMMARY

An object of the present invention is to solve, or at least mitigate, this problem in the art and thus to provide an improved method and scheduling node for scheduling mobile terminals.

This object is attained in a first aspect of the present invention by a method at a scheduling node in a wireless communication network of scheduling mobile terminals submitting Scheduling Requests (SRs) in SR resources. The method comprises detecting that an SR received from a first mobile terminal in a first SR resource is indicated to interfere with at least a second SR resource, scheduling the first mobile terminal at a first scheduling occasion and awaiting scheduling of a second mobile terminal associated with the second SR resource at least until a second scheduling occasion.

This object is attained in a second aspect of the present invention by a scheduling node in a wireless communication network configured to schedule mobile terminals submitting SR in SR resources. The scheduling node comprising a processing unit and a memory, which memory contains instructions executable by the processing unit, whereby the scheduling node is operative to detect that an SR received from a first mobile terminal in a first SR resource is indicated to cause interference to at least a second SR resource, schedule the first mobile terminal at a first scheduling occasion, and await scheduling of a second mobile terminal associated with the second SR resource at least until a second scheduling occasion.

Further provided are a computer program performing the method according to the present invention, and a computer program product comprising computer readable medium having the computer programs embodied therein.

Advantageously, by detecting on e.g. a PUCCH that an SR of a first mobile terminal (in the following referred to as a UE) is indicated to cause interference to a second SR resource, a potentially incorrect scheduling of a second UE associated with the second SR resource can be avoided. Thus, if the SR of the first SR resource leaks into the second SR resource, it may cause a scheduling node such as an eNodeB to falsely detect occurrence of an SR in the second SR resource and hence allocate resources to the second UE, even though the second UE has not requested such allocation. In an embodiment of the present invention, the indication of interference may be obtained by detecting that a magnitude of the SR of the first UE exceeds a certain interference threshold, thereby making it likely that a "strong" first UE in fact causes interference to the second SR resource. The detection of the magnitude of the SR may e.g. be undertaken by measuring received power or and/or Signal-to-Interference-plus-Noise Ratio (SINR).

In an alternative embodiment, the indication of interference may be obtained by detecting that a magnitude of the SR of the first UE is an offset greater than a magnitude of a signal of the second SR resource.

If the scheduler at the eNodeB detects that the SR of the first UE is likely to cause interference to one or more neighbouring SR resources, such as to the SR resource associated with the second UE, at a first scheduling occasion, the eNodeB will advantageously schedule the first UE at the first scheduling occasion, and await scheduling of the second UE at least until a second scheduling occasion occurs, e.g. 10 ms later depending on SR periodicity and SR prohibit timer.

Hence, in the event that an SR of a strong UE leaks into SR resources of one or more neighbouring weaker UEs, incorrect scheduling of the neighbouring UEs can be avoided by taking a scheduling decision at the eNodeB at a later second scheduling occasion. This may be particularly advantageous in a cell where scheduling resources like Physical Downlink Control Channel (PDCCH) capacity and scheduling capacity are bottlenecks, and risk being unnecessarily burdened due to falsely detected SRs. This is even more important if the falsely detected SR is associated with a UE that is estimated to have a poor radio channel and/or with a UE that is currently in a Discontinuous Reception (DRX) sleep mode, since the eNodeB in such a scenario will waste even more resources.

It should be noted that the scheduling occasions are stipulated in the communications network by a set SR periodicity (such as 5 ms, 10 ms, 20 ms, etc.) and an SR prohibit timer. The SR prohibit timer can assume values from 0 to 7. The SR prohibit timer value is given in number of SR period(s). A value of 0 means that no timer is configured for SR transmission on the PUCCH, while a value of 1 corresponds to one SR period, a value of 2 corresponds to two SR periods and so on. The UE starts this timer after transmitting an SR. When this timer is running, the UE is not supposed to be transmitting a further SR on the PUCCH.

In an embodiment of the present invention, after having waited at least until the second scheduling occasion, the scheduler determines whether the second SR resource is indicated to comprise an SR. If so, the second UE is scheduled whereas if it is not, no scheduling will be undertaken. Advantageously, after having waited at least until the second scheduling occasion, it is determined whether the second UE is indicated to in fact have requested scheduling by submitting an SR in the second SR resource, i.e. that the SR is not likely to be a result of interference from the first SR. Thus, false detection of an SR in the first SR resource can advantageously be avoided.

In yet a further embodiment, the determining whether the second SR resource is indicated to comprise an SR is made by detecting at the scheduler whether a magnitude of a signal of the second SR resource exceeds a scheduling threshold value. Hence, if at the second scheduling occasion the magnitude of the signal, in terms of e.g. received power or SINR, exceeds the scheduling threshold value, the signal is considered to comprise an SR, and the scheduler schedules the second UE accordingly.

In still a further embodiment, the scheduler further detects at the second scheduling occasion whether the first SR resource still comprises an SR, the magnitude of which exceeds the interference threshold value. If so, the second UE may have to wait for yet another scheduling occasion, since a potentially detected SR in the second SR resource may be false due to the interference still caused by the first UE. If not, i.e. if the first SR resource is silent, it is likely that the detected SR in the second SR resource in fact is an SR submitted by the second UE, and not a result of interference, and the second UE will thus be scheduled accordingly at the second scheduling occasion. Hence, if no signal is detected in the first SR resource at said second scheduling occasion, it is likely that the scheduler has allocated resources to the first UE as a result of the SR submitted in the first SR resource during the previous scheduling occasion and consequently that an allocation request of the first UE for the time being has been provided for.

It should be noted that the interference threshold advantageously may comprise an upper and a lower threshold value. Hence, if the magnitude of the SR of the first SR resource exceeds the upper value, the first SR is considered to cause interference while if it is to be detected that the first UE currently is silent on the PUCCH (and thus that the first UE has been scheduled), the magnitude of any signal detected in the first SR resource should be below the lower threshold value.

In yet another embodiment, the scheduler further detects at the second scheduling occasion whether a third SR associated with a third UE is indicated to cause interference to the second SR resource. Advantageously, even though, at the second scheduling occasion, the first UE no longer causes interference to the second SR resource, another neighbouring third UE may cause interference in the same way the first UE did at the previous first scheduling occasion. Thus, any false detection of an SR in the second SR resource, this time caused by the third UE, may again be avoided by awaiting scheduling of the second UE at least until a third scheduling occasion.

In still another embodiment, in case the second SR resource is subject to interference at repeated scheduling occasions, the second UE is scheduled anyway after a predetermined number of scheduling occasions has passed, if it is determined that the second SR resource indeed comprises an SR. This is to avoid that any one or more neighbouring UEs which repeatedly request allocation will prevent the second UE from being scheduled.

It should be noted that the interference threshold value and/or the scheduling threshold value may be adjusted, even dynamically in an on-the-fly manner, depending on a current radio environment and requirements of e.g. an operator of the wireless communication network. As has been described, it is desirable to avoid detection of "false" SRs, implying that it may be necessary to adjust, i.e. raise, the scheduling threshold in order to avoid such false SRs. On the other hand, in the event of poor channel quality, it may be necessary to lower the detection threshold to be able to detect a correctly submitted SR in an SR resource.

As can be seen, if the second UE indeed submits an SR in its associated SR resource at a first scheduling occasion, it will have the resubmit the SR at least at the next scheduling occasion (and potentially at another subsequent scheduling occasion) in case it is detected that the first UE (and potentially the third UE) causes interference to the second SR resource. Advantageously, this may avoid the allocation of resources to UEs which effectively have not requested such allocation.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
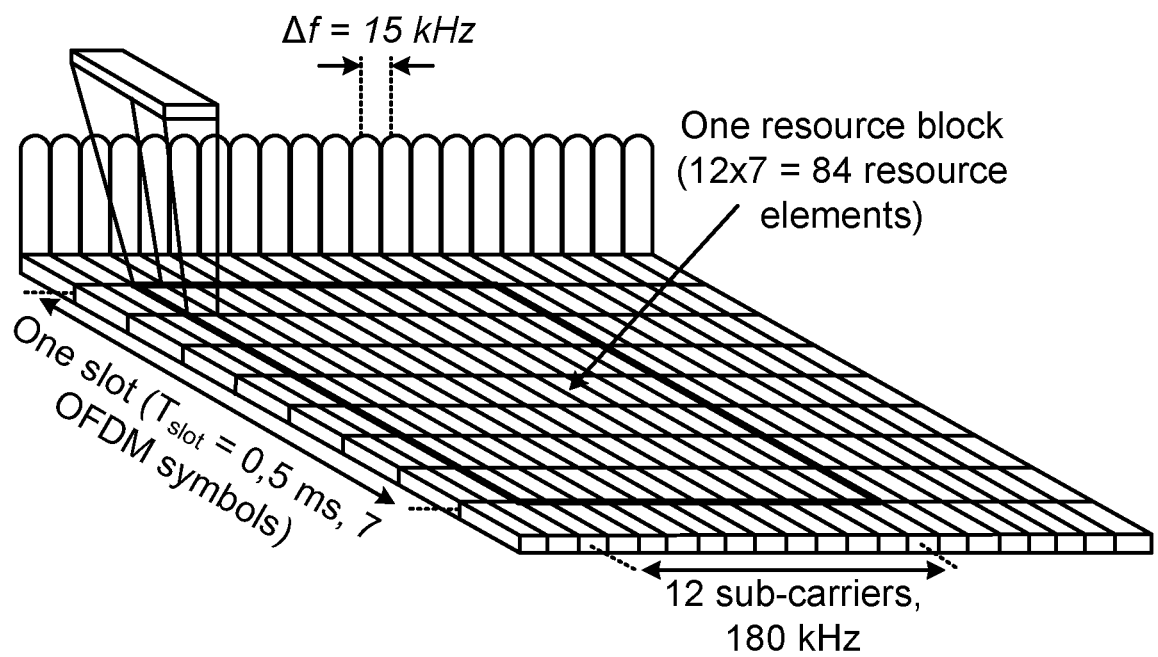
FIG. 1 illustrates the concept of resource blocks used in LTE.

FIG. 1 illustrates the concept of resource blocks used in LTE as previously has been described.

Figure 2A:
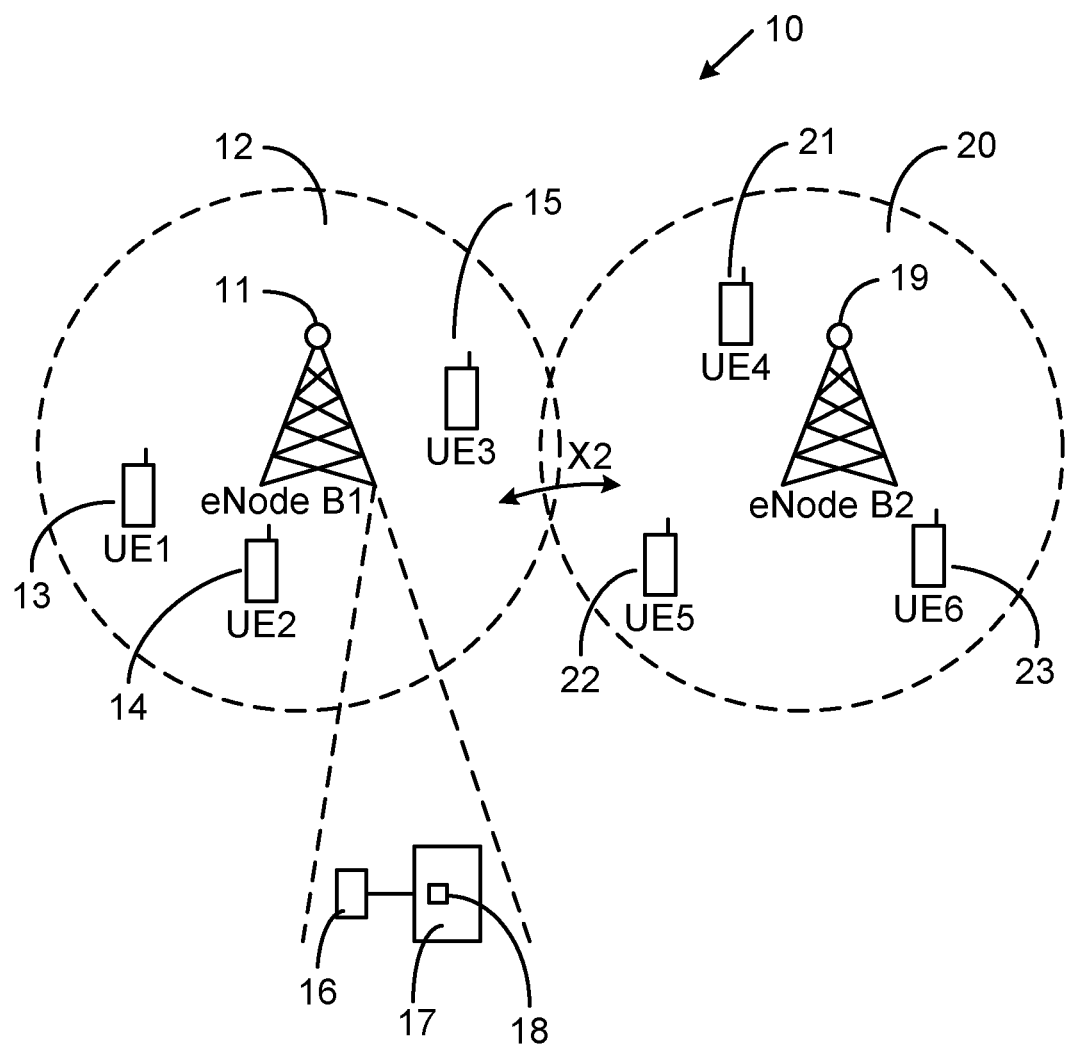
FIG. 2a illustrates a communications network in which the present invention may be implemented.

FIG. 2a illustrates a basic communication network 10 in which the present application can be implemented. It should be noted that FIG. 2a is an illustration only to describe a basic idea of the present invention, and that a communications network in practice typically comprises many different network elements and nodes. A base station 11, referred to as eNodeB1, of a first cell 12 schedules of resources of mobile terminals 13, 14, 15, referred to as UE1, UE2 and UE3, respectively, in the first cell 12. In practice, eNodeB1 of the first cell 12 will schedule a large number of mobile terminals and typically comprises a physical or virtual unit known as a scheduler for performing the scheduling. Thus, eNodeB1 allocates one or more resource blocks at a scheduling time intervals—or scheduling occasions—to the UEs in the first cell 12. Further, scheduling information, in the form of which resource blocks to be allocated, may be sent by eNodeB1 of the first cell 12 over the X2 communication interface to a base station 19 of a second neighbouring cell 20, referred to as eNodeB2. The neighbouring base station eNodeB2 will in its turn schedule resources for the mobile terminals 21, 22, 23, referred to as UE4, UE5 and UE6, respectively (in practice a large number of UEs) of the neighboring cell 20, possibly taking into account the scheduled allocations of eNodeB1 of the first cell 12. Further, as any one or more of UE4, UE5 and UE6 moves towards the first cell 12, they may be handed over to the eNodeB1, in which case eNodeB1 will take over the scheduling of UE4, UE5 and/or UE6.

With further reference to FIG. 2a, the method of scheduling mobile terminals according to embodiments of the present invention at a scheduling node, such as at the base stations 11, 19, is typically performed by a processing unit 16 embodied in the form of one or more microprocessors arranged to execute a computer program 18 downloaded to a suitable storage medium 17 associated with the microprocessor, such as a Random Access Memory (RAM), a Flash memory or a hard disk drive. Thus, as is illustrated by means of dashed lines in FIG. 2a, the processing unit 16 and the storage medium 17 are included in the first base station 11. The processing unit 16 is arranged to carry out the method according to embodiments of the present invention when the appropriate computer program 18 comprising computer-executable instructions is downloaded to the storage medium 17 and executed by the processing unit 16. The storage medium 17 may also be a computer program product comprising the computer program 18. Alternatively, the computer program 18 may be transferred to the storage medium 17 by means of a suitable computer program product, such as a Digital Versatile Disc (DVD) or a memory stick. As a further alternative, the computer program 18 may be downloaded to the storage medium 17 over a network. The processing unit 16 may alternatively be embodied in the form of a digital signal processor (DSP), an application specific integrated circuit (ASIC), a field-programmable gate array (FPGA), a complex programmable logic device (CPLD), etc. Further, even though not shown in FIG. 2a, the second base station 19 typically comprises a corresponding processing unit and memory unit comprising a computer program executable by the processing unit.

It should be noted that the scheduling node according to embodiments of the present invention could be performed by any other appropriate node, and not necessarily a Radio Access Network (RAN) node, such as an eNodeB, but for example an Evolved Packet Core (EPC) network node such as a Serving Gateway (SGW), a Mobility Management Entity (MME), a Packet Data Network Gateway (PGW), etc. Moreover, the functionality of the scheduling node according to embodiments of the present invention may even be distributed among a plurality of different nodes.

With reference to FIGS. 2b-e the eNodeB 11 comprises a scheduler 24 which typically is embodied by the processing unit 16 of FIG. 2a.

Figure 2B:
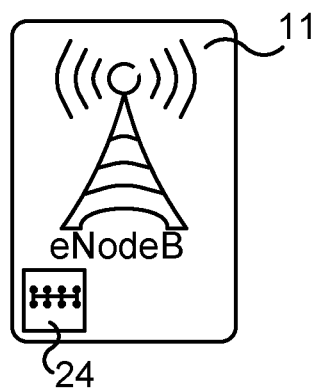
FIG. 2b-e illustrates various implementations of a scheduler according to embodiments of the present invention.
Figure 2C:
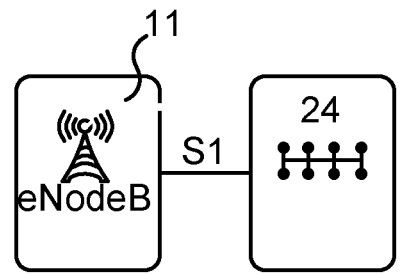
Figure 2D:
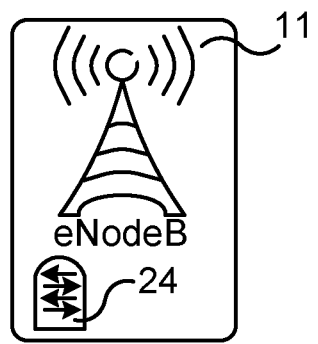
Figure 2E:
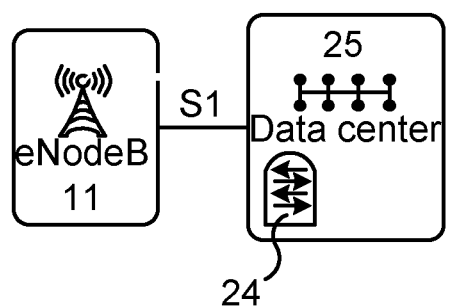

FIG. 2b illustrates the scheduler 24 as a physical unit in the eNodeB 11, FIG. 2c illustrates the scheduler 24 as a physical unit separate from the eNodeB 11, FIG. 2d illustrates the scheduler 24 as a virtual unit in the eNodeB 11 and finally FIG. 2e illustrates the scheduler 24 as a virtual unit in a data center 25.

Now, as previously was discussed, the Physical Uplink Control Channel (PUCCH) is used in LTE in order to provide send control information in uplink from a UE to a base station (i.e. an eNodeB). The control information may consist of Scheduling Request (SR), Channel State Information (CSI) or Hybrid Automatic Repeat Request Acknowledgement (HARQ-ACK) feedback for downlink transmissions.

Figure 3:
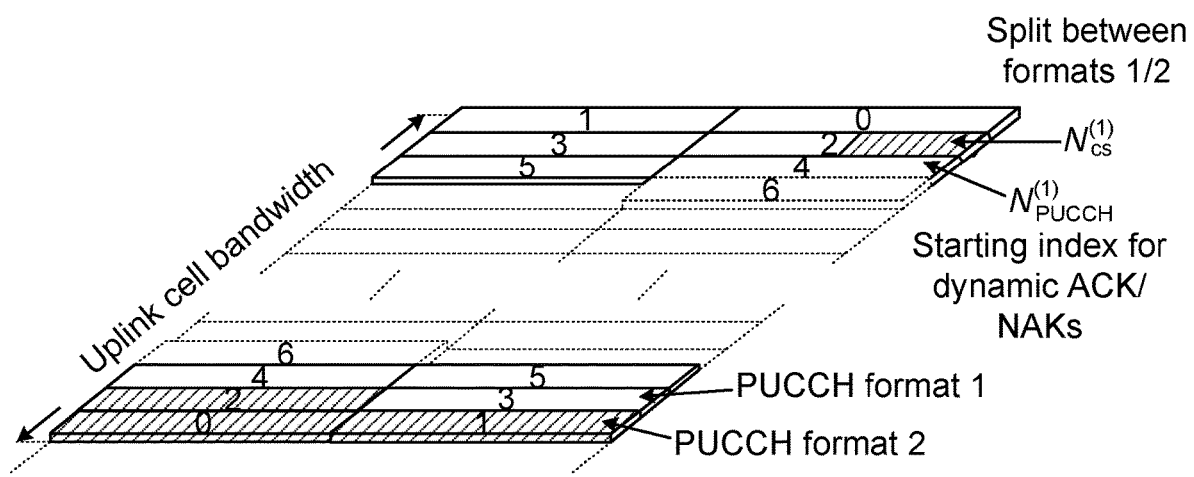
FIG. 3 illustrates PUCCH transmission using RB pair.

With reference to FIG. 3, the PUCCH is transmitted on a Resource Block (RB) pair that is allocated on the band edge. PUCCH format 2 is allocated in the first RB pairs, followed by PUCCH format 1/1a/1b.

Figure 4:
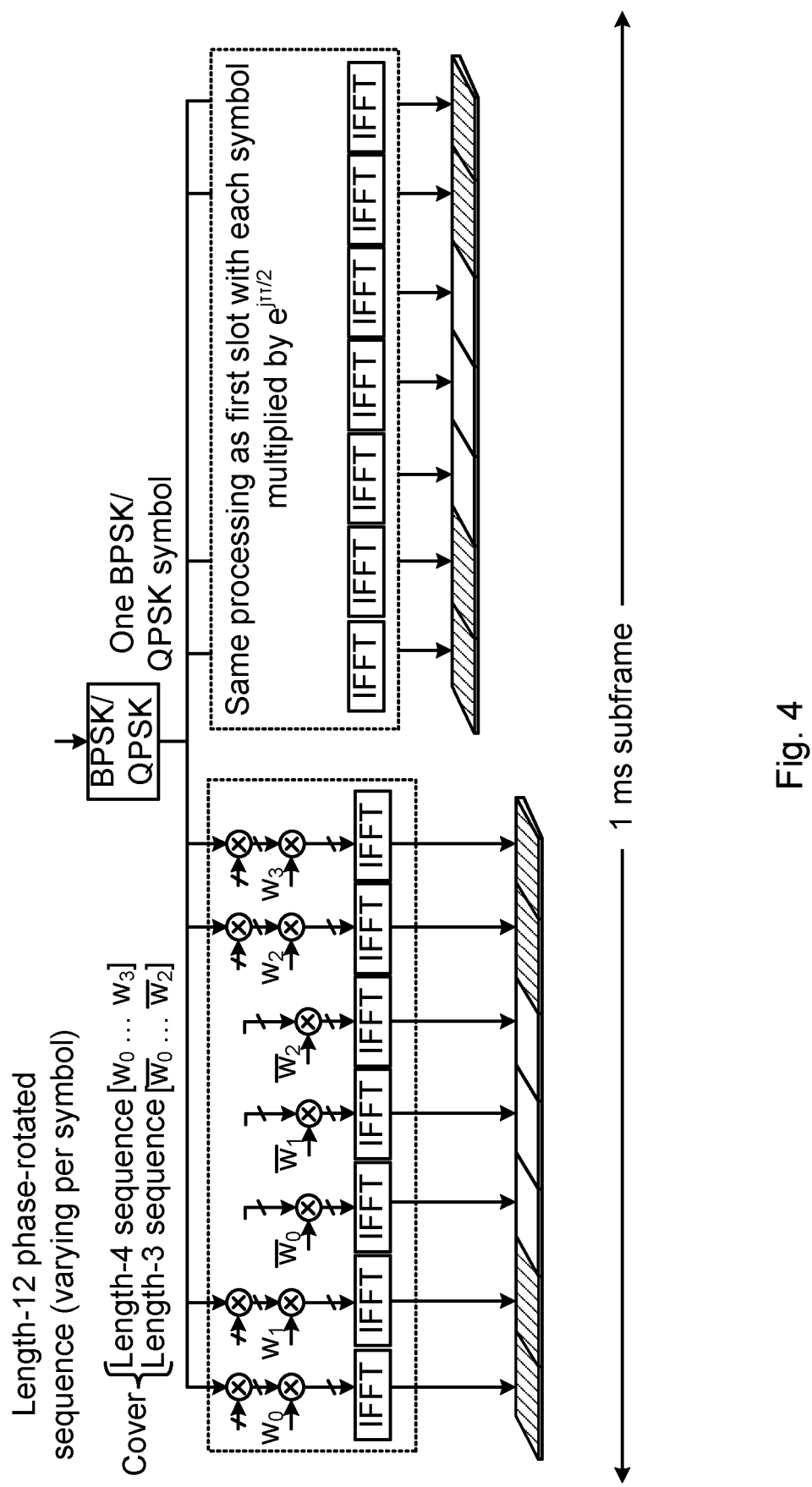
FIG. 4 illustrates modulation and physical channel mapping for various PUCCH formats.

FIG. 4 illustrates modulation and physical channel mapping for PUCCH format 1/1a/1b. In each slot, 4 symbols are used for data and 3 symbols for the reference signal. This is valid for normal cyclic prefix and when no Sounding Reference Signal (SRS) is present. The data symbol is multiplied with a length-12 reference signal sequence, scrambled depending on resource index, and spread with an orthogonal cover sequence. The modulation and physical channel mapping is described in detail in 3GPP TS 36.211.

In this procedure, multiple users that transmit PUCCH format 1/1a/1b are multiplexed on the same RB pair. The multiplexing uses Code Division Multiple Access (CDMA) by assigning different cyclic shifts and orthogonal cover sequences to the users. The cyclic shift affects the reference signal sequence which will introduce a time shift in the transmitted signal. Thus, the transmitted signals for the users that are multiplexed in an RB pair are orthogonal to each other.

In the eNodeB, the received signal in an RB pair for PUCCH format 1/1a/1b is processed in order to separate the signals from the users that are multiplexed. The signals are truly orthogonal to each other in the eNodeB only under ideal conditions. These ideal conditions include perfect time alignment when received in the eNodeB, including no delay spread in the radio channel, no frequency error between the UE and eNodeB and no Doppler shift or Doppler spread. In practice, the conditions are typically not ideal, so the signals from the users are not perfectly orthogonal.

If the received signals from the multiplexed users are not orthogonal, there will be leakage between the users causing degraded performance in the demodulating and decoding process. Timing errors or delay spread will introduce leakage between cyclic shifts.

Figure 5:
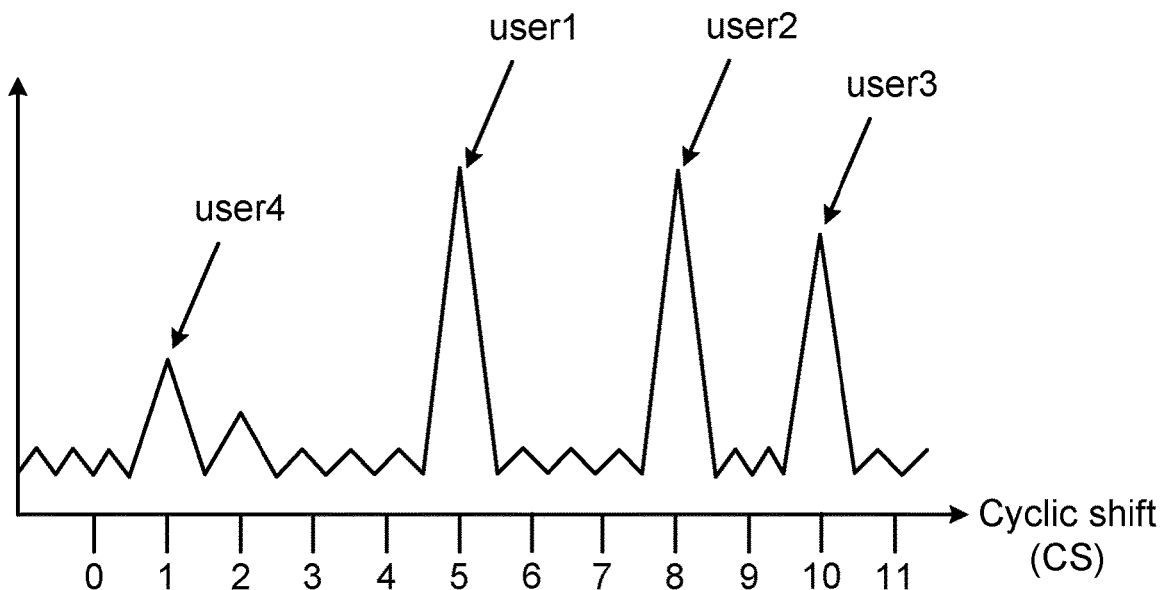
FIG. 5 illustrates UE SR submission without SR resource interference.

FIG. 5 illustrates the received signals of four UEs at an eNodeB at SR resource indices 1, 5, 8 and 10 after matched filtering with the reference signal sequence and transforming the filtered result to time domain. The four UEs are assigned different cyclic shifts and can be separated from the time domain signal. Note that FIG. 5 illustrates ideal conditions when there is no leakage between the UEs, i.e. an SR in an SR resource associated with any one of the UEs does not cause interference to an SR resource of any one of the other UEs.

Another type of leakage occurs it two UEs have the same cyclic shift and different orthogonal cover code. In that case, if there is a frequency error between a UE and the eNodeB or Doppler spread or Doppler shift in the channel, the UEs will not be orthogonal when de-spreading with the orthogonal cover code. Consequently, an SR of an SR resource associated with any one of the UEs may leak into, and thus cause interference to, an SR resource of any one of the other UEs.

When there is leakage between UEs, demodulation and decoding performance can be affected negatively. As previously has been discussed in detail, if one UE is received with high signal strength, any leakage into the SR resource for another UE may cause decoding errors. Alternatively, if the other UE does not transmit anything—i.e. the other UE does not submit an SR—the leakage may look like a real signal, and the eNodeB may perform a false detection. Hence, in order to ensure good system performance it is important to be able to tolerate leakage between users that are multiplexed on the PUCCH. This is particularly important for a PUCCH configuration with high capacity, where all cyclic shifts and orthogonal cover codes are used. The capacity on PUCCH is determined by a parameter known as delta-PUCCH-Shift, which determines the cyclic shift spacing for UEs with the same orthogonal cover code.

Figure 6A:
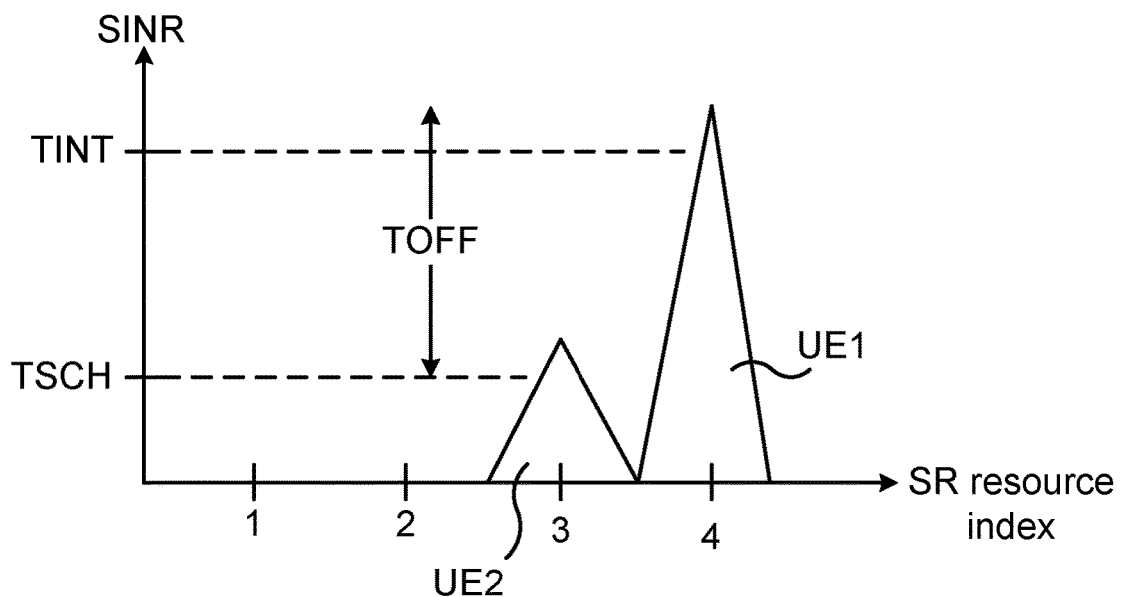
FIG. 6a illustrates a scenario where a first UE is indicated to cause interference to an SR resource of a second UE at a first scheduling occasion.

FIG. 6a illustrates a situation where a first UE, UE1, is indicated to cause interference to an SR resource of a second UE, UE2. That is, UE1 transmits a strong SR in its associated SR resource, which strong SR may cause interference to neighboring SR resources, such as the SR resource of UE2. It should be noted that UE1 with SR resource index 4 not necessarily must be located directly adjacent, in terms of neighboring resource index, to UE2 with SR resource index 3 for causing interference, but may very well cause interference to a potentially third UE (not shown) with SR resource index 2.

Figure 6B:
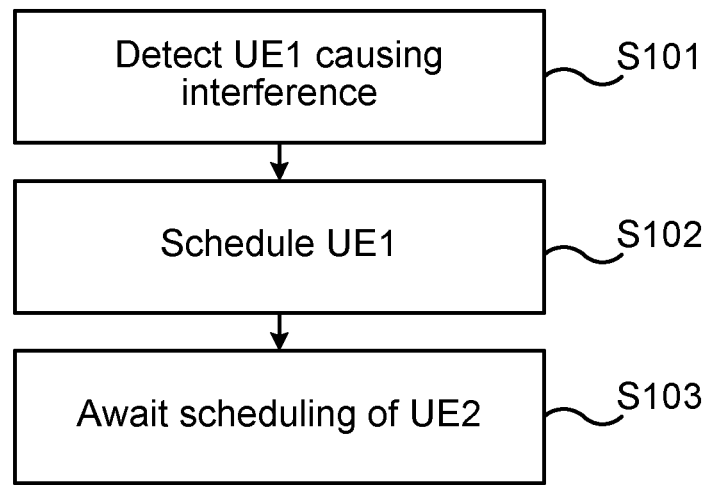
FIG. 6b illustrates a flowchart of the method of scheduling mobile terminals submitting SRs in SR resources according to an embodiment of the present invention.

FIG. 6b illustrates a flowchart of the method of scheduling mobile terminals submitting SRs in SR resources according to an embodiment of the present invention. Reference is further made to FIG. 6a illustrating a "strong" UE1 neighbouring a "weak" UE2.

Thus, in a first step S101, a scheduler at eNodeB1 detects that the SR received from UE1 in the first SR resource at SR resource index 4 is indicated to interfere with a second SR resource at index 3 with which UE2 is associated.

Advantageously, by detecting on a PUCCH that an SR of UE1 is indicated to cause interference to a second SR resource, a potentially incorrect scheduling of UE2 associated with the second SR resource can be avoided. For instance, in an embodiment of the present invention the indication of UE1 causing interference is obtained by detecting that a magnitude of the SR of UE1 exceeds a certain interference threshold $T_{INT}$ in terms of e.g. SINR. Alternatively, the indication may be obtained by detecting that a magnitude of the SR of UE1 is an offset $T_{OFF}$ greater than a magnitude of a signal of UE2.

In yet a further alternative, as has been discussed hereinabove, the indication of interference may be obtained by detecting whether cyclic shift of two SR resources in a same RB pair are susceptible to timing error. Thus, eNodeB1 detects that a cyclic shift of the SR of the first SR resource associated with UE1, which is located in the same RB pair as the second SR resource associated with UE2, is susceptible to timing error and thus causes interference to the second SR resource.

In still a further alternative, the indication of interference may be obtained by detecting whether the orthogonal codes of two SR resources in a same RB pair are susceptible to frequency error. Thus, eNodeB1 detects that an orthogonal code of the SR of the first SR resource associated with UE1, which is located in the same RB pair as the second SR resource associated with UE2, is susceptible to frequency error and thus causes interference to the second SR resource.

In the following, the determination whether UE1 causes interference or not is performed by detecting that a magnitude of the SR of UE1 exceeds a certain interference threshold $T_{INT}$.

Now, in step S102, UE1 is scheduled at a first scheduling occasion, since the SR resource associated with UE1 comprises an SR.

However, since the SR of UE1 was indicated to cause interference at the first scheduling occasion, the scheduler of eNodeB1 will in step S103 await scheduling of UE2 at least until a next second scheduling occasion.

As can be seen, in the event that an SR of a strong UE—i.e. that of UE1—leaks into SR resources of one or more neighbouring weaker UEs—i.e. that of UE2—incorrect scheduling of UE2 can be avoided by taking a scheduling decision at eNodeB1 at a later second scheduling occasion.

It should be noted, as previously discussed, that the scheduling occasions are stipulated in the communications network by a set SR periodicity (such as 5 ms, 10 ms, 20 ms, etc.) and an SR prohibit timer. The SR prohibit timer can assume values from 0 to 7. The SR prohibit timer value is given in number of SR period(s). A value of 0 means that no timer is configured for SR transmission on the PUCCH, while a value of 1 corresponds to one SR period, a value of 2 corresponds to two SR periods and so on. The UE starts this timer after transmitting an SR. When this timer is running, the UE is not supposed to be transmitting a further SR on the PUCCH.

Figure 7A:
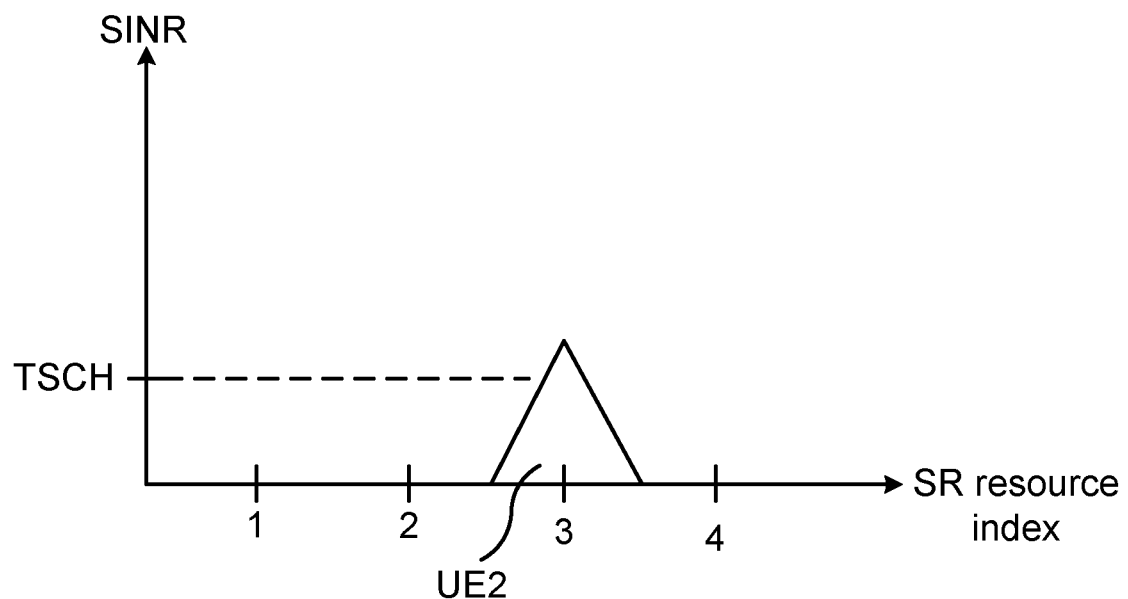
FIG. 7a illustrates a scenario at a next second scheduling occasion, where no interference is caused.

FIG. 7a illustrates a scenario at the next second scheduling occasion, where UE1 indeed was scheduled at the preceding first scheduling occasion of FIG. 6a (and no longer submits an SR requesting scheduling). In an exemplifying embodiment, this could be determined by concluding whether a signal of the SR resource of UE1 is below the interference threshold value $T_{INT}$.

Figure 7B:
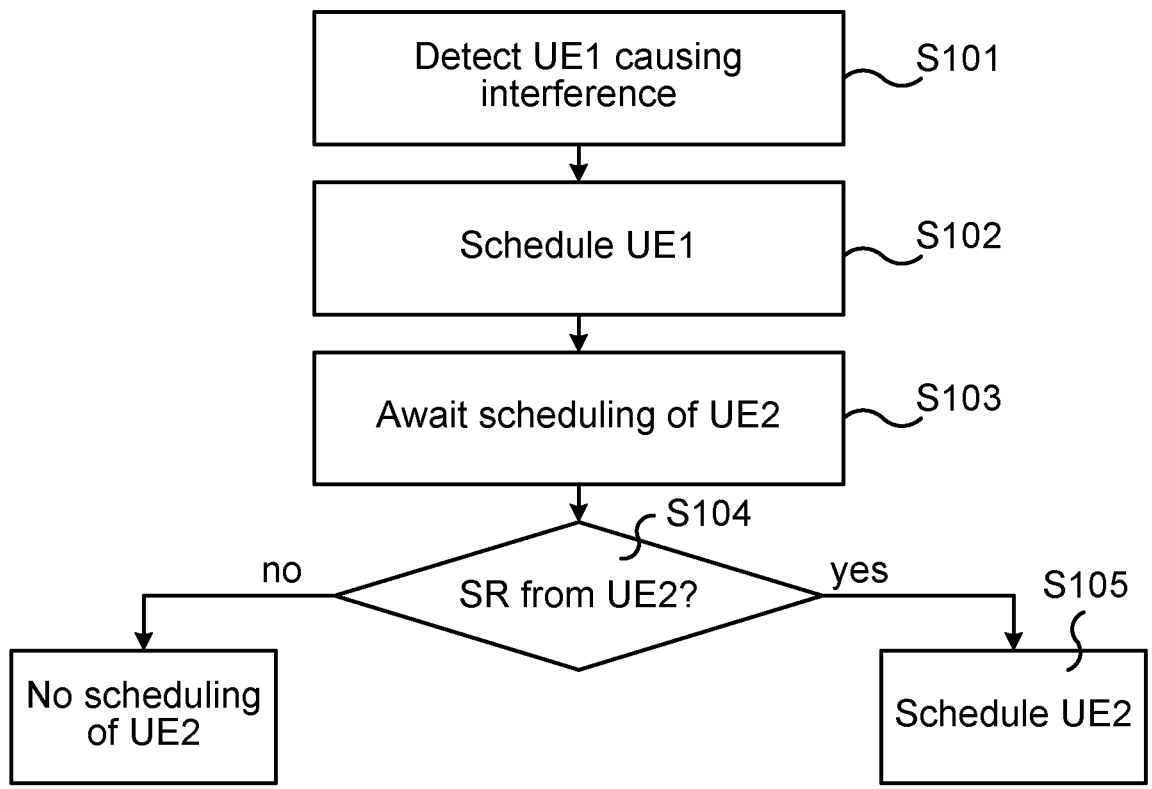
FIG. 7b illustrates a flowchart of the method of scheduling mobile terminals submitting SRs in SR resources according to another embodiment of the present invention.

FIG. 7b illustrates a flowchart of the method of scheduling mobile terminals submitting SRs in SR resources according to a further embodiment of the present invention. Now, after having detected interference caused by UE1 in step S101, scheduling UE1 at the first scheduling occasion in step S102, and awaited scheduling of UE2 in step S103, eNodeB1 now determines in step S104 whether the second SR resource, i.e. the resource associated with UE2, is indicated to comprise an SR. If so, UE2 is scheduled at this second scheduling occasion instep S105. If not, any signal in the SR resource of UE2 at the first scheduling occasion was most likely caused by interference from UE1.

In an embodiment of the present invention, the determining whether the second SR resource is indicated to comprise an SR in step S104 is made by detecting at the scheduler whether a magnitude of a signal of the second SR resource exceeds a scheduling threshold value $T_{SCH}$. Hence, if at the second scheduling occasion the magnitude of the signal, in terms of e.g. SINR, exceeds the scheduling threshold value $T_{SCH}$, the signal is considered to comprise an SR, and the scheduler schedules UE2 accordingly. Indeed, with reference to FIG. 7a, the SINR of the SR resource of UE2 exceeds $T_{SCH}$, and the scheduler thus schedules UE2 in step S105 at the second scheduling occasion.

Figure 8:
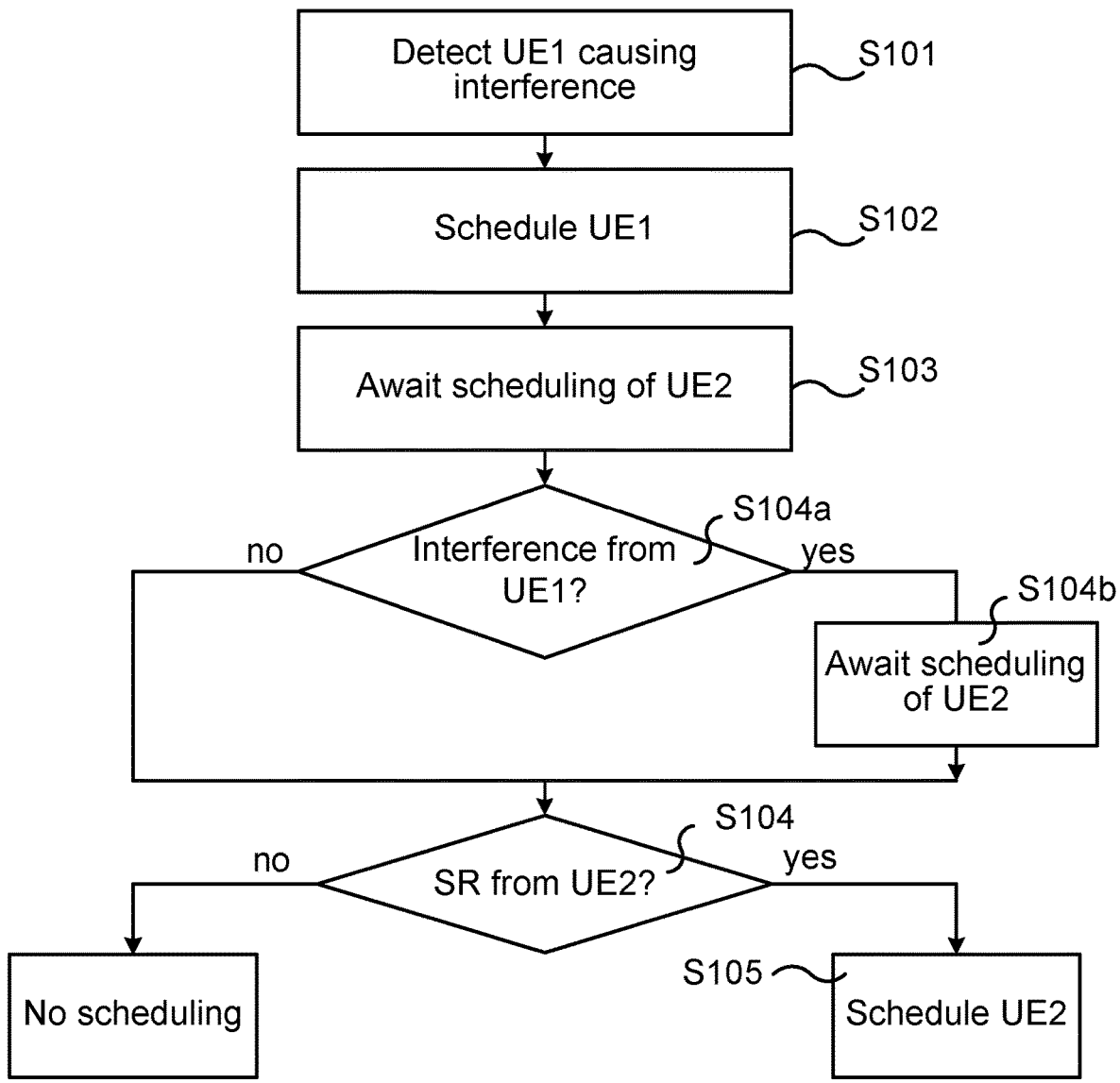
FIG. 8 illustrates a flowchart of the method of scheduling mobile terminals submitting SRs in SR resources according to yet another embodiment of the present invention.

FIG. 8 illustrates a flowchart of the method of scheduling mobile terminals submitting SRs in SR resources according to still a further embodiment of the present invention. Assuming that at the second scheduling occasion, the interference scenario is that shown in FIG. 6a. In such a scenario, after having performed steps S101, S102 and S103 as previously described, the scheduler further detects at the second scheduling occasion whether the first SR resource still comprises an SR in step S104a. If UE1 has still not been scheduled, or requests further resources, it is determined whether the SINR (in this example), exceeds the interference threshold value $T_{INT}$. If so, the scheduler will in step S104b await scheduling of UE2 for yet another scheduling occasion, since a potentially detected SR in the second SR resource may be false due to the interference still caused by UE1. If not, the scheduler proceeds to steps S104 and S105 as previously described with reference to FIG. 7a.

In still another embodiment, in case the second SR resource associated with UE2 is subject to interference at repeated scheduling occasions, i.e. UE1 continues to submit SRs in the first SR resource at the second, third, fourth occasion and so on, UE2 is scheduled anyway after a predetermined number of scheduling occasions has passed, if it is determined that the second SR resource indeed comprises an SR. This is to avoid that any one or more neighbouring UEs which repeatedly request allocation will prevent the UE2 from being scheduled.

Figure 9A:
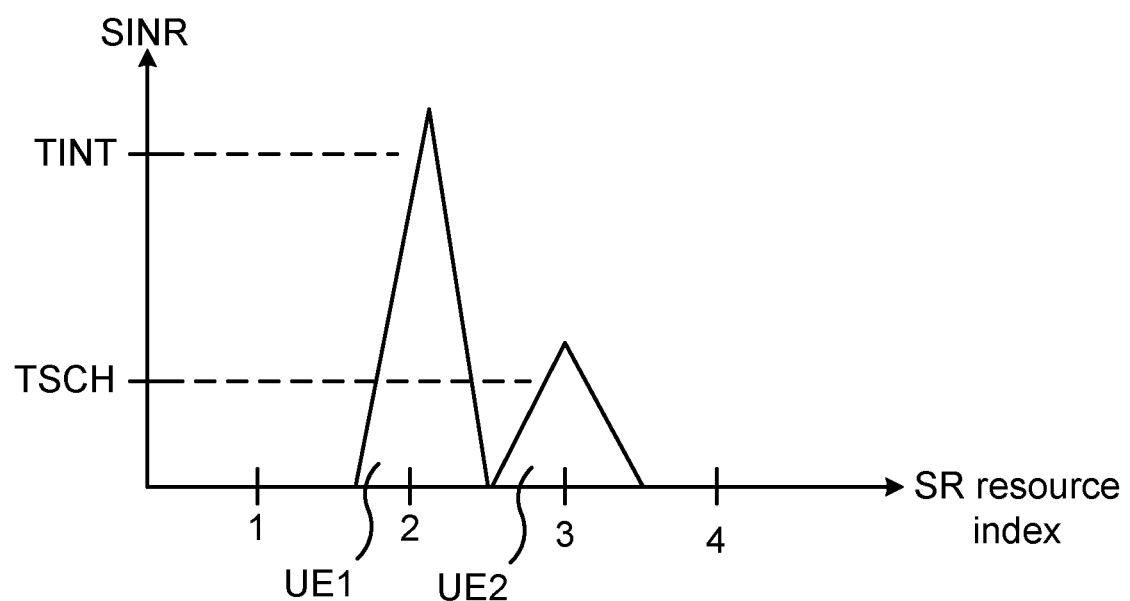
FIG. 9a illustrates yet a scenario at the next second scheduling occasion, where a third UE is indicated to cause interference to an SR resource of the second UE.

FIG. 9a illustrates yet a scenario at the next second scheduling occasion, where UE1 indeed was scheduled at the preceding first scheduling occasion of FIG. 6a (and no longer submits an SR requesting scheduling). However, at the second scheduling occasion, a third UE, UE3, is now indicated to cause interference to the SR resource of UE2. In an exemplifying embodiment, this could be determined by concluding whether a signal of the SR resource of UE3 exceeds the interference threshold value $T_{INT}$.

Figure 9B:
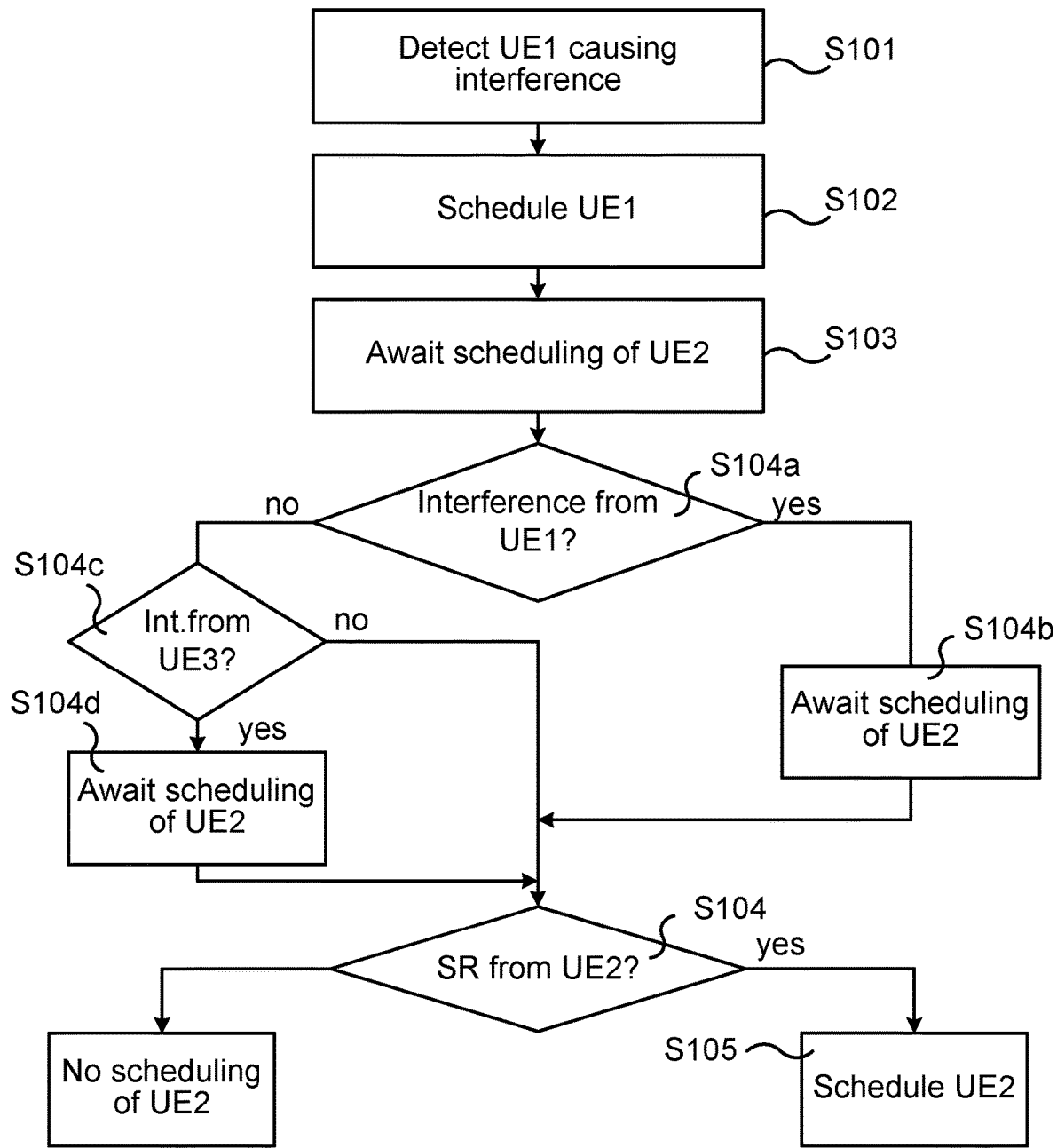
FIG. 9b illustrates a flowchart of the method of scheduling mobile terminals submitting SRs in SR resources according to still another embodiment of the present invention.

FIG. 9b illustrates a flowchart of the method of scheduling mobile terminals submitting SRs in SR resources according to yet a further embodiment of the present invention. Now, after having detected interference caused by UE1 in step S101, scheduling UE1 at the first scheduling occasion in step S102, and awaited scheduling of UE2 in step S103, eNodeB1 determines in step S104, the scheduler further detects at the second scheduling occasion whether the first SR resource still comprises an SR in step S104a, as previously have been described with reference to FIG. 8. In this particular example, UE 1 has been scheduled, and the scheduler further detects at step S104c at the second scheduling occasion whether a third SR associated with UE3 is indicated to cause interference to the second SR resource associated with UE1. Since such indication is detected in that the SINR of UE3 exceeds $T_{INT}$, eNodeB1 awaits scheduling of UE2 in step S104d until a subsequent third scheduling occasion. The base station eNodeB1 then proceeds, at the third scheduling occasion, to steps S104 and S105 as previously described.

Thus, any false detection of an SR in the second SR resource, this time caused by UE3, may again advantageously be avoided by awaiting scheduling of UE2 at least until the third scheduling occasion.

Figure 10:
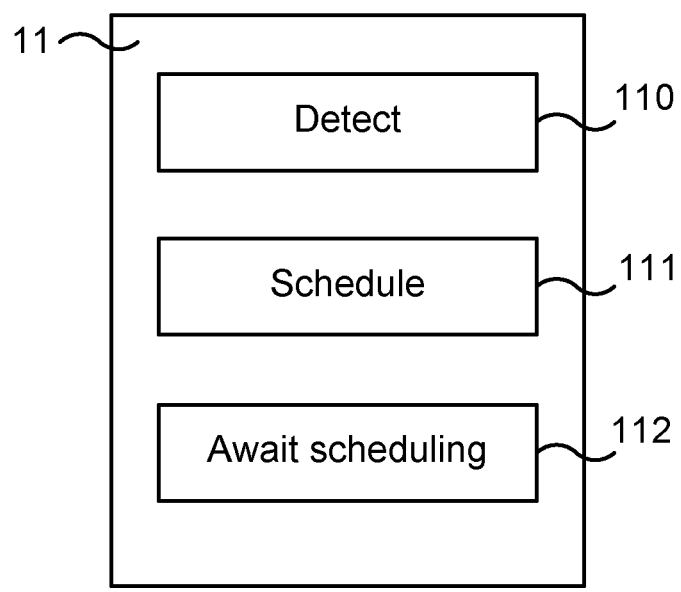
FIG. 10 illustrates a scheduling node according to an embodiment of the present invention.

FIG. 10 shows a scheduling node 11 according to an embodiment of the present invention. The scheduling node 11 comprises detecting means 110 adapted to detect that an SR received from a first mobile terminal in a first SR resource is indicated to cause interference to at least a second SR resource, scheduling means 111 adapted to schedule the first mobile terminal at a first scheduling occasion, and waiting means 112 adapted to await scheduling of a second mobile terminal associated with the second SR resource at least until a second scheduling occasion. The detecting means 110 and/or the scheduling means 111 may comprise a communications interface for receiving and providing information to other devices. The scheduling node 11 may further comprise a local storage for storing obtained data. The detecting means 110, scheduling means 111 and waiting means 112 may (in analogy with the description given in connection to FIG. 2a) be implemented by a processing unit embodied in the form of one or more microprocessors arranged to execute a computer program downloaded to a suitable storage medium associated with the microprocessor, such as a RAM, a Flash memory or a hard disk drive. The detecting means no and scheduling means 111 may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method at a scheduling node in a wireless communication network of scheduling mobile terminals submitting Scheduling Requests, SRs, in SR resources, comprising:
   detecting that a first SR received from a first mobile terminal in a first SR resource is indicated to cause interference to at least a second SR resource, wherein the detecting comprises detecting that an orthogonal code of the first SR resource, being in a same Resource Block, RB, pair as the second SR resource, is susceptible to frequency error, wherein the detecting that the first SR of the first SR resource is indicated to cause interference comprises:
   detecting that a cyclic shift of the first SR of the SR first resource, being in a same Resource Block, RB, pair as the second SR resource, is susceptible to timing error;
   scheduling the first mobile terminal at a first scheduling occasion; and
   awaiting scheduling of a second mobile terminal associated with the second SR resource at least until a second scheduling occasion,
      wherein in case the second SR resource is subject to interference at repeated scheduling occasions, the second mobile terminal is scheduled after a predetermined number of scheduling occasions has passed, if it is determined that the second SR resource comprises a second SR.

2. The method of claim 1, wherein the detecting that the first SR of the first SR resource is indicated to cause interference comprises:
   detecting that a magnitude of the first SR of the first SR resource exceeds an interference threshold value.

3. The method of claim 1, further comprising: determining, at said second scheduling occasion, whether the second SR resource is indicated to comprise the second SR; and if so
   scheduling the second mobile terminal.

4. The method of claim 3, wherein the determining whether the second SR resource is indicated to comprise the second SR comprises:
   detecting that a magnitude of a signal of the second SR resource exceeds a scheduling threshold value.

5. The method of claim 4, wherein the determining whether the second SR resource is indicated to comprise the second SR comprises:
   detecting, at said second scheduling occasion, that a magnitude of the first SR of the first SR resource exceeds an interference threshold value; and if so
   awaiting scheduling of the second mobile terminal at least until a third scheduling occasion.

6. The method of claim 4, wherein the determining whether the second SR resource is indicated to comprise the second SR comprises:
   detecting, at said second scheduling occasion, that a magnitude of the first SR of the first SR resource is below an interference threshold value.

7. The method of claim 6, wherein in case it is determined that the second SR resource is considered to comprise the second SR and that a magnitude of the first SR of the first SR resource is below an interference threshold value at the second scheduling occasion, the method further comprises:
   detecting whether a third SR received from a third mobile terminal in a third SR resource is indicated to cause interference to the second SR resource at the second scheduling occasion; and if so
   awaiting scheduling of the second mobile terminal associated with the second SR resource at least until a third scheduling occasion.

8. The method of claim 1, wherein the detecting that the first SR of the first SR resource is indicated to cause interference comprises:
   detecting that a magnitude of the first SR of the first SR resource is an offset greater than a magnitude of a signal of the second SR resource.

9. A scheduling node in a wireless communication network configured to schedule mobile terminals submitting Scheduling Requests, SRs, in SR resources, the scheduling node comprising a processor and a memory, said memory containing instructions executable by said processor, whereby said scheduling node is operative to:
   detect that a first SR received from a first mobile terminal in a first SR resource is indicated to cause interference to at least a second SR resource, when detecting, the scheduling node is further operative to detect that an orthogonal code of the first SR of the SR first resource, being in a same Resource Block, RB, pair as the second SR resource, is susceptible to frequency error, when detecting that the first SR of the first SR resource is indicated to cause interference, to:
   detect that a cyclic shift of the first SR of the SR first resource, being in a same Resource Block, RB, pair as the second SR resource, is susceptible to timing error;
   schedule the first mobile terminal at a first scheduling occasion; and
   await scheduling of a second mobile terminal associated with the second SR resource at least until a second scheduling occasion,
      wherein in case the second SR resource is subject to interference at repeated scheduling occasions, the second mobile terminal is scheduled after a predetermined number of scheduling occasions has passed, if it is determined that the second SR resource comprises a second SR.

10. The scheduling node of claim 9, further being operative, when detecting that the first SR of the first SR resource is indicated to cause interference, to:
    detect that a magnitude of the first SR of the first SR resource exceeds an interference threshold value.

11. The scheduling node of claim 9, further being operative to:
    determine, at said second scheduling occasion, whether the second SR resource is indicated to comprise the second SR; and if so
    schedule the second mobile terminal.

12. The scheduling node of claim 11, further being operative, when determining whether the second SR resource is indicated to comprise the second SR, to:
    detect that a magnitude of a signal of the second SR resource exceeds a scheduling threshold value.

13. The scheduling node of claim 12, further being operative, when determining whether the second SR resource is indicated to comprise the second SR, to:
    detect, at said second scheduling occasion, that a magnitude of the first SR of the first SR resource exceeds an interference threshold value; and if so
    await scheduling of the second mobile terminal at least until a third scheduling occasion.

14. The scheduling node of claim 12, further being operative, when determining whether the second SR resource is indicated to comprise the second SR, to:
- detect, at said second scheduling occasion, that a magnitude of the first SR of the first SR resource is below an interference threshold value.

15. The scheduling node of claim 14, further being operative, in case it is determined that the second SR resource is considered to comprise the second SR and that a magnitude of the first SR of the first SR resource is below an interference threshold value at the second scheduling occasion, to:
- detect whether a third SR received from a third mobile terminal in a third SR resource is indicated to cause interference to the second SR resource at the second scheduling occasion; and if so
- await scheduling of the second mobile terminal associated with the second SR resource at least until a third scheduling occasion.

16. The scheduling node of claim 9, further being operative, when detecting that the second SR of the first SR resource is indicated to cause interference, to:
- detect that a magnitude of the first SR of the first SR resource is an offset greater than a magnitude of a signal of the second SR resource.

17. A non-transitory computer storage medium storing computer-executable instructions for causing a device to perform steps recited in claim 1 when the computer-executable instructions are executed on a processor included in the device.

18. A non-transitory computer program product comprising a computer readable medium, the computer readable medium having the computer-executable instructions according to claim 17 embodied therein.

* * * * *